United States Patent [19]
Matsunaga et al.

[11] Patent Number: 5,700,419
[45] Date of Patent: Dec. 23, 1997

[54] PROCESS FOR PRODUCING SINTERED ITO COMPACT

[75] Inventors: Osamu Matsunaga, Yokohama; Akio Kondo, Kohnan, both of Japan

[73] Assignee: Tosoh Corporation, Japan

[21] Appl. No.: 745,625

[22] Filed: Nov. 8, 1996

[30] Foreign Application Priority Data

Nov. 8, 1995 [JP] Japan .................. 7-290080

[51] Int. Cl.$^6$ .................. C04B 35/457
[52] U.S. Cl. .................. 264/656; 264/614; 264/651; 264/657; 264/667; 264/669; 264/674; 501/134
[58] Field of Search .................. 264/63, 614, 651, 264/656, 657, 667, 669, 674; 501/134

[56] References Cited

U.S. PATENT DOCUMENTS

| | | | |
|---|---|---|---|
| 4,624,808 | 11/1986 | Lange | 264/56 |
| 5,160,675 | 11/1992 | Iwamoto et al. | 264/56 |
| 5,433,901 | 7/1995 | Rancoule et al. | 264/63 |

*Primary Examiner*—James Derrington
*Attorney, Agent, or Firm*—Nixon & Vanderhye

[57] ABSTRACT

A sintered ITO compact having an ultra-high density of at least 7.08 g/cm$^3$ is produced by a process wherein an aqueous slurry comprised of indium oxide, tin oxide, a binder, a dispersant and an aqueous medium is cast in a mold, and the thus-obtained cast green body is sintered. The aqueous slurry used is prepared by the steps of:

dispersing uniformly a tin oxide powder and a dispersant in an aqueous medium to give an aqueous slurry;

allowing the aqueous slurry to stand whereby coarse particles of tin oxide are sedimented;

separating by decantation an upper liquid layer of the aqueous slurry containing finely divided particles of tin oxide (preferably, the secondary particle sizes of which are not larger than 4 μm) and the dispersant from a lower liquid layer containing the sedimented coarse particles; and then, incorporating an indium oxide powder and a binder in the separated upper liquid layer containing finely divided tin oxide particles and the dispersant to give an aqueous slurry.

8 Claims, No Drawings

PROCESS FOR PRODUCING SINTERED ITO COMPACT

BACKGROUND OF THE INVENTION

(1) Field of the Invention

This invention relates to a sintered indium tin oxide (hereinafter abbreviated to "ITO") compact which is used for making a transparent electrically conductive thin film.

(2) Description of the Related Art

An ITO thin film is characterized as possessing a high electrical conductivity and a high transmission and in that the fine photo-lithgraphy can be easily effected, and therefore, the ITO thin film is widely used as, for example, a transparent electrode for a flat panel display device, a solar cell window, and an antistatic conductive film. In recent years, flat panel display devices including a liquid crystal display device become large-sized and of finer quality, and therefore, there is an increasing demand for an ITO thin film used as pixel electrodes for a flat panel display device.

The processes for making an ITO film are classified into two types, i.e., chemical film-deposition processes such as spray or chemical vapor deposition (CVD) pyrolysis, and physical film-deposition processes such as electron-beam evaporation or sputtering. Of these, sputtering is widely used in various fields because an ITO thin film having a large size and a high performance can be easily fabricated.

In the production of an ITO thin film by sputtering, a sputtering target is used which includes a metal alloy target composed of metallic indium and metallic tin (this metal alloy target is hereinafter abbreviated to "IT target") and a composite oxide target composed of indium oxide and tin oxide (this composite oxide target is hereinafter abbreviated to "ITO target"). The ITO target is more popularly used than the IT target because variation with time of resistance and transmission of the ITO thin film fabricated by using the ITO target is minor and the film-forming conditions can be easily controlled.

Where an ITO target is continuously sputtered in an atmosphere of an argon-oxygen gas mixture, a black matter called "nodule" will appear on the target surface with the increase of integrated sputtering time. The black matter is considered to be a sub-oxide of indium and is formed on the periphery of the erosion race track of the target. It is known that the nodule occasionally leads to arcing during sputtering and causes generation of particles. Consequently, when sputtering is continuously carried out, defects will be found in the formed thin film, which lead to reduction of the yield of flat panel displays of liquid display devices and cause failure of elements. The failure of elements is serious in the field where a high precision is required, such as flat panel displays.

To prevent or minimize the formation of defects in the thin films, a cleaning operation for removing nodules on the target surface must be conducted at regular intervals in the conventional production of ITO thin films. This leads to reduction of productivity. It is therefore eagerly desired to provide an ITO target which is less liable to cause the nodule formation.

SUMMARY OF THE INVENTION

In view of the foregoing, a primary object of the present invention is to provide a process for advantageously producing a sintered high-density ITO compact which gives an improved ITO sputtering target characterized in that undesirable nodule occurrence on the target surface can be prevented or minimized when sputtering is effected for the formation of ITO thin films used as transparent electrodes of a flat panel display or in other applications.

In accordance with the present invention, there is provided a process for producing a sintered ITO compact wherein an aqueous slurry comprised of indium oxide, tin oxide, a binder, a dispersant and an aqueous medium is cast in a mold, and the thus-obtained cast green body is sintered; said aqueous slurry being prepared by the steps of:

dispersing uniformly a tin oxide powder and a dispersant in an aqueous medium to give an aqueous slurry;

allowing the aqueous slurry to stand whereby coarse particles of tin oxide are sedimented;

separating by decantation an upper liquid layer of the aqueous slurry containing finely divided particles of tin oxide and the dispersant from a lower liquid layer containing the sedimented coarse particles; and then, incorporating an indium oxide powder and a binder in the separated upper liquid layer containing finely divided tin oxide particles and the dispersant to give an aqueous slurry.

Preferably, the aqueous slurry is allowed to stand for the sedimentation of coarse particles of tin oxide for a time sufficient for making not larger than 4 µm the secondary particle size of the finely divided particles of tin oxide contained in the upper liquid layer of the aqueous slurry to be separated by decantation.

Preferably, the indium oxide powder to be incorporated in the separated upper liquid layer is a compacted powder having a tap density of 1.2 to 2.4 g/cm$^3$.

The sintered ITO compact produced by the process of the present invention usually has an ultra-high density of at least 7.08 g/cm$^3$, and gives a sputtering target characterized in that nodule occurrence on the target surface can be prevented or minimized when used for the formation of ITO thin films.

DETAILED DESCRIPTION OF PREFERRED EMBODIMENTS

In the process of the present invention, first an aqueous slurry comprised of indium oxide, tin oxide, a binder, a dispersant and an aqueous medium is prepared by dispersing a tin oxide powder and a dispersant in an aqueous medium. Usually a tin oxide powder is incorporated in an aqueous medium and a dispersant is added into the aqueous medium. The mixture is stirred by a stirring means such as a stirrer or a stirring vane, and, if desired, the mixture is irradiated with ultrasonic wave to uniformly disperse the tin oxide powder in the aqueous medium. The stirring is carried out preferably for at least one hour for obtaining a uniform dispersion.

As the aqueous medium used, water is preferably used which includes, for example, deionized water, distilled water and ultra-pure water. The amount of the aqueous medium is preferably in the range of 50 to 80% by weight based on the weight of the tin oxide powder. When the amount of the aqueous medium is too large or too small, it becomes difficult to obtain a uniform dispersion having a desired specific gravity to an extent such that finely divided tin oxide particles can be obtained in a high yield by decantation.

As the dispersant, organic compounds such as polycarboxylic acids or derivatives thereof are usually used. As specific examples of the polycarboxylic acids or derivatives thereof, there can be mentioned homopolymers and copolymers of acrylic acid or methacrylic acid; homopolymers and copolymers of acrylic acid salts or methacrylic acid salts, such as ammonium acrylate, ammonium methacrylate, an alkali metal salt of acrylic acid or an alkali metal salt of methacrylic acid; and homopolymers and copolymers of acrylic acid esters or methacrylic acid esters, such as methyl acrylate, methyl methacrylate, ethyl acrylate, ethyl methacrylate, n-butyl acrylate, n-butyl methacrylate, isobutyl acrylate or isobutyl methacrylate. The amount of the dispersant is preferably smaller than 2% by weight based on the weight of the tin oxide powder for avoiding the agglomeration of finely divided tin oxide particles and obtaining the desired dispersing effect.

Preferably at least 70% by volume of the tin oxide powder to be dispersed in the aqueous medium is composed of secondary particles having a particle size of not larger than 1 μm. The tin oxide powder having such particle size distribution is obtained, for example, by pulverizing tin oxide by a ball mill or other means for at least about 10 hours prior to the incorporation in the aqueous medium. By using the tin oxide powder having such particle size distribution, the desired finely divided ingredients within the tin oxide powder can be obtained in a high yield.

The aqueous slurry having tin oxide particles uniformly dispersed therein is then allowed to stand for a predetermined time whereby coarse particles of tin oxide contained in the aqueous slurry are sedimented. In general the sedimentation rate of particles dispersed in a liquid dispersion is determined by the Stokes' law expressed by the following equation. Namely the sedimentation rate varies depending upon the particular particle diameter.

$$Vi=0.03267\times(\rho s-\rho f)\times Di^2/\mu$$

wherein Di is diameter of particles (μm), Vi is sedimentation rate (mm/min.) of particles having a particle diameter (Di), ρs is density of particles (g/cm$^2$), ρf is density of liquid medium (g/cm$^3$), and μ is viscosity of liquid medium (centipoise).

Thus the time of sedimentation (Ti) required for allowing the particles having a particle diameter (Di) settling by a distance (L) from the liquid level of dispersion to the bottom is expressed by the equation:

$$Ti=L/Vi.$$

The sedimentation rate of particles having a diameter larger than Di exhibits a sedimentation rate larger than Vi, and therefore, the large particles settle by a distance larger than L for the sedimentation time (Ti). Thus, when the sedimentation time Ti has elapsed, particles having a diameter larger than Di are not present in an upper liquid layer spanning from the liquid level to the depth L in the liquid dispersion. Therefore, by separating by decantation the upper liquid layer spanning from the liquid level to the depth L, a tin oxide powder having any desired largest particle diameter can be obtained.

In the process of the present invention, the aqueous slurry is allowed to stand for the sedimentation of coarse tin oxide particles preferably for a time sufficient for making not larger than 4 μm, more preferably not larger than 1 μm, the secondary particle size of the finely divided tin oxide particles contained in the upper liquid layer of the aqueous slurry to be separated. Namely, the finely divided tin oxide particles, which are contained in the upper liquid layer separated by decantation from the lower liquid layer, have a maximum secondary particle size of preferably not larger than 4 μm, more preferably not larger than 1 μm. By utilizing the upper liquid layer of the aqueous dispersion having the tin oxide particles with a maximum secondary particle size of not larger than 4 μm, the density of the sintered ITO compact can be more enhanced.

The upper liquid layer separated by decantation preferably contains the finely divided tin oxide particles with a maximum secondary particle diameter of not larger than 4 μm in an amount of 0.3 to 0.5 g/ml. The content of the finely divided tin oxide particles can easily be determined by measuring the specific gravity of the separated upper liquid layer.

Predetermined amounts of an indium oxide powder, a binder, an optional dispersant and an aqueous medium are incorporated in the separated upper liquid layer containing the finely divided tin oxide particles, followed by mixing by using, for example, a ball mill to give an aqueous slurry to be cast in a mold.

The dispersant optionally used is not particularly limited, and, as preferable examples thereof, there can be mentioned polycarboxylic acids and derivatives thereof, which are recited as regards the dispersant used for the preparation of an aqueous tin oxide slurry.

The amount of the dispersant in the aqueous slurry to be cast in a mold is preferably smaller than 2% by weight based on the total weight of tin oxide and indium oxide. When the amount of the dispersant is smaller than 2% by weight, undesirable agglomeration of finely divided tin oxide and indium oxide particles can be avoided with the desired dispersing effect.

The amount of the binder in the aqueous slurry to be cast in a mold is preferably smaller than 2% by weight, more preferably 0.5 to 1.5% by weight, based on the total weight of tin oxide and indium oxide. When the amount of the binder is smaller than 2% by weight, crack occurrence in the step of dewaxing for the removal of organic ingredients can be avoided.

As specific examples of the binder, there can be mentioned a mixture of ethylhydroxyethylcellulose with an acrylic acid-acrylamide copolymer, a mixture of polyethylene oxide with polyvinyl alcohol, an acrylic acid-methacrylic acid copolymer, an acrylic acid ester-methacrylic acid ester copolymer, an acrylic acid-acrylamide copolymer, and a mixture of an acrylic acid-acrylic amide copolymer with polyethylene oxide.

The aqueous slurry preferably has a viscosity of 100 to 5,000 centipoise, more preferably 500 to 2,500 centipoise in view of workability and yield in the molding step. By the term "viscosity of the aqueous slurry" used herein is meant that as determined according to JIS-K7117-1987 by using Bismetron SB-type viscometer supplied by Shibaura System K.K. with an SB #3 spindle at room temperature (25° C.), a number of revolution of 60 min$^{-1}$ and a measurement time of 1 minute.

The aqueous slurry preferably contains 5 to 15% by weight of tin oxide and 95 to 85% by weight of indium oxide, based on the total weight of tin oxide and indium oxide. When the proportion of tin oxide and indium oxide satisfies this requirement, an ITO film formed by sputtering a target made of the resulting sintered ITO compact exhibits desirably low resistivity.

The indium oxide powder to be incorporated in the aqueous slurry containing tin oxide dispersed therein is preferably a compacted powder having a tap density of 1.2 to 2.4 g/cm$^3$, more preferably 1.5 to 2.2 g/cm$^3$. When an indium oxide powder having a tap density of this range is incorporated, a highly compacted green body is obtained and, in the step of dewaxing, crack occurrence due to gasification of the binder and the dispersant can be prevented, and the finally sintered compact has an enhanced density. The indium oxide powder having the above-specified tap density is prepared, for example, by a method wherein an indium oxide powder having a tap density of about 0.8 g/cm$^3$ is dry ball-milled for at least 16 hours.

By the term "tap density" herein used we mean the bulk density of a closely packed powder which is determined by a method wherein a cylinder is filled with a powder, the cylinder is tapped to reduce the volume of the powder to a minimum value, and the tap density is calculated from the volume and weight of the thus-closely packed powder. The number of tapping and the tapping amplitude are not particularly limited. The tapping may be carried out until the volume of the filled powder is reduced to a constant value.

For example, the tapping of the filled powder is carried out at least 500 times at a tapping amplitude of 60 mm.

Preferably the aqueous slurry having tin oxide and indium oxide dispersed therein is deaerated before the aqueous slurry is cast in a mold. The deaeration may be carried out, for example, by adding an anti-foaming agent such as a polyalkylene glycol in the slurry and place the slurry in vacuum.

The mold used for casting the aqueous slurry is not particularly limited. A mold made of a porous material or plaster may be used. The molding pressure is preferably in the range of 3 to 25 kg/cm$^2$ in view of productivity.

The as-cast green body is then dried. More specifically, the as-cast green body is allowed to stand at room temperature for at least 24 hours to remove water as much as possible for the prevention of crack occurrence, and thereafter, dried in an oven. The drying in the oven is preferably carried out by gradually elevating the temperature of the pre-dried green body from about 40° C. to about 120° C. When the shrinkage rate of the pre-dried green body is large, moisture control may be conducted, if desired.

The dried green body is preferably compacted by cold isostatic pressing at a pressure of at least 2 ton/cm$^2$. Then the compacted green body is subjected to a dewaxing treatment at a temperature of 300° to 500° C. to remove residual water and organic materials such as a binder and a dispersant. To prevent crack occurrence in the course of gasification of the binder and dispersant, the compacted green body is preferably heated to the dewaxing temperature at a heating rate of not higher than 5° C./hr, more preferably not higher than 3° C./hr.

The thus-molded and treated green body is then sintered in a furnace. The sintering is preferably effected in an oxygen atmosphere, more preferably in a substantially pure oxygen atmosphere and at an atmospheric pressure. Preferably oxygen gas is introduced into the furnace at a linear velocity of 2.5 cm/min during sintering. By introducing oxygen, a sintered ITO compact having an enhanced density can be obtained. The sintering temperature is preferably in the range of 1,450° to 1,550° C. At this sintering temperature, tin oxide is easily solid-soluted into indium oxide. The sintering time is usually at least 3 hours for enhancing the sintered density to a desired value.

The thus-obtained sintered ITO compact usually has an ultra-high density of at least 7.08 g/cm$^3$.

The sintered compact is machined into a desired shape for a sputtering target. The sintered ITO compact having an ultrahigh density has a hardness higher than that of the conventional ITO sintered compact, and thus, crack tends to occur inside the sintered compact during machining. Therefore a wet machining is preferable. If desired, the sputtering surface may be mirror-polished by using, for example, an alumina slurry for eliminating fine scratches remaining on the surface after the wet machining. The thus-treated sintered ITO compact is bonded onto a backing plate made of, for example, oxygen-free copper by using a indium solder to form a sputtering target.

The invention will now be specifically described by the following examples that by no means limit the scope of the invention.

In the examples, the tap density of an indium oxide powder was determined by a method wherein a glass cylinder having a diameter of 30 mm is filled with 100 g of the powder, and the cylinder was tapped 1,000 times at a tapping amplitude of 60 mm and a tapping rate of 34 times per minute, and the tap density is calculated from the volume and weight of the thus-closely packed powder.

EXAMPLE 1

A polyethylene pot having a volume of 5 liters was charged with 1.000 g of a tin oxide powder having a maximum particle size of 9.0 μm and a median particle size of 1.9 μm, and 5 kg of nylon balls having a diameter of 15 mm with an iron core. The tin oxide powder was pulverized by ball milling for 48 hours. By this ball milling, at least 70% by volume of the tin oxide powder became secondary particles having a particle size of not larger than 1 μm.

A polyethylene vessel was charged with 800 g of deionized water, and 540 g of the pulverized tin oxide powder and 2.7 g (i.e., 0.2% by weight based on the weight of the tin oxide powder) of a polycarboxylate dispersant ("A-40" supplied by Kyowa Sangyo K.K.; solid content of 40%, an ammonium salt of an acrylic acid ester-acrylic acid (40/60 by weight) copolymer having a molecular weight of about 3,000) were incorporated in the vessel. The content in the vessel was irradiated with ultra-sonic waves for 1 hour while being stirred by stirring vanes to give an aqueous slurry having a tin oxide powder uniformly dispersed therein. The liquid level of the content in the vessel was 135 mm from the bottom thereof.

When the sedimentation rate of a tin oxide powder having a diameter of 4.0 μm was determined according to the Stokes' sedimentation formula, the sedimentation rate was 3.11 mm/min. The time required for which the tin oxide powder having a particle diameter of 4.0 μm sediments from the liquid level to a distance of 115 mm from the liquid level was calculated as 0.616 hours.

The above-prepared aqueous slurry containing a tin oxide powder dispersed therein was allowed to stand for 0.62 hour, and an upper liquid layer of the aqueous slurry spanning from the top of the aqueous slurry to a distance of 115 mm from the top level of the aqueous slurry was separated by decantation, i.e., by using a micro-tube pump. The separated upper liquid layer had a specific gravity of 1.31 g/cm$^3$. The relationship of specific gravity of the tin oxide-containing liquid dispersion with content of tin oxide in the liquid dispersion was examined, and it has been found that the separated upper liquid layer contained 0.371 g of tin oxide per cm$^3$ of the upper liquid layer. Thus 108 ml of the separated upper liquid layer contained 40.0 g of tin oxide.

Into the separated upper liquid layer, 360 g of an indium oxide powder having a maximum particle size of 4.0 μm, a median particle size of 0.6 μm and a tap density of 1.2 g/cm$^3$, 10.8 g of a polycarboxylate dispersant ("A-40" supplied by Kyowa Sangyo K.K.), 8.0 g of a polyacrylate binder ("WE-518" supplied by Chukyou Yushi K.K.; solid content of 50%, a polyacrylic acid ester-polymethacrylic acid ester copolymer), and 3 g of deionized water were added. The mixture was uniformly mixed together by ball milling for 16 hours. The thus-prepared aqueous slurry had a viscosity of 1,200 centipoises.

To the aqueous slurry, 1 ml of a polyalkylene glycol anti-foaming agent ("CA-220" supplied by Nippon Oil & Fat Co.) was added, and the mixture was deaerated in vacuum. The deaerated aqueous slurry was cast in a mold at a pressure of 5 kg/cm$^2$. The molded green body was dried, and compacted by cold isostatic pressing at a pressure of 3 ton/cm$^2$ to give a green body having a density of 3.65 g/cm$^3$. To remove residual dispersant and binder from the green body, the green body was placed in a furnace where it was dewaxed under the following conditions.

Dewaxing temperature: 450° C.

Heating rate: 5° C./Hr

Keep time: 0

The dewaxed green body had a density of 3.64 g/cm$^3$.

Then the dewaxed green body was sintered in a pure oxygen atmosphere in a sintering furnace under the following conditions.

Sintering temperature: 1,500° C.

Heating rate: 25° C./Hr

Sintering time: 5 hours
Linear velocity of introduced oxygen: 8.0 cm/min

The density of the sintered ITO compact was 7.08 g/cm$^3$ as measured by the Archimedes' method.

The sintered ITO compact was wet-machined into a disc shape having a diameter of 76.2 mm and a thickness of 6 mm. The shaped sintered compact was bonded to a backing plate made of oxygen-free copper by an indium solder to give a sputtering target. Using the thus-prepared target, continuous discharge was conducted under the following sputtering conditions.

DC power: 120 W (2.6 W/cm$^2$)
Gas pressure: 0.5 Pa
Flow rate of argon gas: 50 SCCM
Flow rate of oxygen gas: 0.6 SCCM From the time of about 60 hours after the start of the test, occurrence of nodules was observed in the vicinity of erosion race track, but the amount thereof was only smaller than 0.1% based on the entire area of the target surface. This determination of the amount of nodules on the target surface was conducted by a method wherein an optical photograph of the entire target surface was taken, the photograph was processed by an image scanner, and the obtained information was image-analyzed (i.e., the area of nodule occurrence was discriminated from the noduleless area) by an computer.

EXAMPLE 2

An upper liquid layer of the aqueous slurry having a tin oxide powder dispersed therein prepared by the same method as in Example 1 was separated by decantation. The separated liquid layer had a specific gravity of 1.31.

An indium oxide powder having a maximum particle size of 4.0 μm and a median particle size of 0.6 μm was compacted by using a dry ball mill for 48 hours to give a powder having a tap density of 2.0 g/cm$^3$. To 108 ml of the separated upper liquid layer, 360 g of the indium oxide powder, 10.8 g of a polycarboxylate dispersant ("A-40" supplied by Kyowa Sangyo K.K.; solid content of 40%, an ammonium salt of an acrylic acid ester-acrylic acid (40/60 by weight) copolymer), 8.0 g of a polyacrylate binder ("WE-518" supplied by Chukyou Yushi K.K.; solid content of 50%, a polyacrylic acid ester-polymethacrylic acid ester copolymer), and 3 g of deionized water were added. The mixture was uniformly mixed by ball-milling for 16 hours. The resulting uniform aqueous slurry had a viscosity of 600 centipoises.

To the uniform aqueous slurry, 1 ml of a polyalkylene glycol anti-foaming agent ("CA-220" supplied by Nippon Oil & Fat Co.) was added, and the mixture was deaerated in vacuum. The deaerated aqueous slurry was cast in a mold at a pressure of 5 kg/cm$^2$. The molded green body was dried, and compacted by cold isostatic pressing at a pressure of 3 ton/cm$^2$ to give a green body having a density of 4.00 g/cm$^3$. To remove residual dispersant and binder from the green body, the green body was placed in a furnace where it was dewaxed under the following conditions.

Dewaxing temperature: 450° C.
Heating rate: 3° C./Hr
Keep time: 0

The dewaxed green body had a density of 4.00 g/cm$^3$.

Then the dewaxed green body was sintered in a pure oxygen atmosphere in a sintering furnace under the following conditions.

Sintering temperature: 1,500° C.
Heating rate: 25° C./Hr
Sintering time: 10 hours
Linear velocity of introduced oxygen: 8.0 cm/min The density of the sintered ITO compact was 7.12 g/cm$^3$ as measured by the Archimedes' method.

The sintered ITO compact was wet-machined into a disc shape and the disc was bonded to a backing plate by the same procedure as in Example 1 to give a sputtering target.

Using the thus-prepared target, sputtering was conducted under the same conditions as those employed in Example 1. No nodule occurrence was observed over the entire life of the target.

EXAMPLE 3

A polyethylene pot having a volume of 5 liters was charged with 1,000 g of a tin oxide powder having a maximum particle size of 9.0 μm and a median particle size of 1.9 μm, and 5 kg of nylon balls having a diameter of 15 mm with an iron core. The tin oxide powder was pulverized by ball milling for 48 hours.

A polyethylene vessel was charged with 800 g of deionized water, and 540 g of the pulverized tin oxide powder and 2.7 g (i.e., 0.2% by weight based on the weight of the tin oxide powder) of a polycarboxylate dispersant ("A-40" supplied by Kyowa Sangyo K.K.; solid content of 40%, an ammonium salt of an acrylic acid ester-acrylic acid (40/60 by weight) copolymer) were incorporated in the vessel. The content in the vessel was irradiated with ultra-sonic waves for 1 hour while being stirred by stirring vanes to give an aqueous slurry having a tin oxide powder uniformly dispersed therein. The liquid level of the content in the vessel was 135 mm from the bottom thereof.

When the sedimentation rate of a tin oxide powder having a diameter of 1.0 μm was determined according to the Stokes' sedimentation formula, the sedimentation rate was 0.194 mm/min. The time required for which the tin oxide powder having a diameter of 1.0 μm sediments from the liquid level to a distance of 115 mm from the liquid level was calculated as 9.9 hours.

The above-prepared aqueous slurry containing a tin oxide powder dispersed therein was allowed to stand for 9.9 hours, and an upper liquid layer of the aqueous slurry spanning from the top of the aqueous slurry to a distance of 115 mm from the top level of the aqueous slurry was separated by decantation using a micro-tube pump. The separated upper liquid layer had a specific gravity of 1.29 g/cm$^3$. The relationship of specific gravity of the tin oxide-containing liquid dispersion with content of tin oxide in the liquid dispersion was examined, and it has been found that the separated upper liquid layer contained 0.348 g of tin oxide per cm$^3$ of the upper liquid layer. Thus 115 ml of the separated upper liquid layer contained 40.0 g of tin oxide.

Into the separated upper liquid layer, 360 g of an indium oxide powder having a maximum particle size of 4.0 μm, a median particle size of 0.6 μm and a tap density of 2.0 g/cm$^3$, 10.8 g of a polycarboxylate dispersant ("A-40" supplied by Kyowa Sangyo K.K.), and 8.0 g of a polyacrylate binder ("WE-518" supplied by Chukyou Yushi K.K.; solid content of 50%, a polyacrylic acid ester-polymethacrylic acid ester copolymer). The mixture was uniformly mixed together by ball milling for 16 hours. The thus-prepared aqueous slurry had a viscosity of 560 centipoises.

To the aqueous slurry, 1 ml of a polyalkylene glycol anti-foaming agent ("CA-220" supplied by Nippon Oil & Fat Co.) was added, and the mixture was deaerated in vacuum. The deaerated aqueous slurry was cast in a mold at a pressure of 5 kg/cm$^2$. The molded green body was dried, and compacted by cold isostatic pressing at a pressure of 3 ton/cm$^2$ to give a green body having a density of 4.05 g/cm$^3$. To remove residual dispersant and binder from the green body, the green body was placed in a furnace where it was dewaxed under the following conditions.

Dewaxing temperature: 450° C.
Heating rate: 3° C./Hr

Keep time: 0

The dewaxed egreen body had a density of 4.05 g/cm³.

Then the dewaxed green body was sintered in a pure oxygen atmosphere in a sintering furnace under the following conditions.

Sintering temperature: 1,500° C.
Heating rate: 25° C./min
Sintering time: 5 hours
Linear velocity of introduced oxygen: 10.0 cm/min The density of the sintered ITO compact was 7.15 g/cm³ as measured by the Archimedes' method.

The sintered ITO compact was wet-machined into a disc shape and the disc was bonded to a backing plate by the same procedure as mentioned in Example 1 to give a sputtering target. Using the thus-prepared target, sputtering was conducted under the same conditions as those employed in Example 1. No nodule occurrence was observed over the entire life of the target.

Comparative Example 1

40 g of a tin oxide powder having a maximum particle size of 9.0 µm and a median particle size of 1.9 µm, 360 g of an indium oxide powder having a maximum particle size of 4.0 µm, a median particle size of 0.6 µm and a tap density of 2.0 g/cm³, 11.0 g of a polycarboxylate dispersant ("A-40" supplied by Kyowa Sangyo K.K.; solid content of 40%, an ammonium salt of an acrylic acid ester-acrylic acid (40/60 by weight) copolymer), 8.0 g of a polyacrylate binder ("WE-518" supplied by Chukyou Yushi K.K.; solid content of 50%, a polyacrylic acid ester-polymethacrylic acid ester copolymer) and 104.6 g of deionized water were mixed together by ball milling for 16 hours to prepare a uniform aqueous slurry.

The uniform aqueous slurry was molded, compacted by cold isostatic pressing and then dewaxed by the same procedures as described in Example 1. The obtained green body had a density of 3.80 g/cm³. Then the dewaxed green body was sintered under the same conditions as those in Example 1 to give a sintered ITO compact. The sintered ITO compact had a density of 6.86 g/cm³ as measured by the Archimedes' method.

The sintered ITO compact was wet-machined into a disc shape and the disc was bonded to a backing plate by the same procedure as mentioned in Example 1 to give a sputtering target. Using the thus-prepared target, sputtering was conducted under the same conditions as those employed in Example 1. From the time of about 30 hours after the start of the test, nodule occurrence was observed gradually in the vicinity of erosion race track. From the time of about 60 hours after the start of the test, the amount of nodule reached 30.6% of the entire surface of the target.

The sintered ITO compact made by the process of the present invention has an ultra-high density of at least 7.08 g/cm³. Therefore, an ITO sputtering target made therefrom is characterized in that, when sputtered, no nodule occurs on the erosion race track of the target surface and undesirable particle generation can be prevented with resulting in increase in the yield of LCD production.

What is claimed is:

1. A process for producing a sintered ITO compact wherein an aqueous slurry comprised of indium oxide, tin oxide, a binder, a dispersant and an aqueous medium is cast in a mold, and the thus-obtained cast green body is sintered; said aqueous slurry being prepared by the steps of:

dispersing uniformly a tin oxide powder and a dispersant in an aqueous medium to give an aqueous slurry;

allowing the aqueous slurry to stand whereby coarse particles of tin oxide are sedimented;

separating by decantation an upper liquid layer of the aqueous slurry containing finely divided particles of tin oxide and the dispersant from a lower liquid layer containing the sedimented coarse particles; and then, incorporating an indium oxide powder and a binder in the separated upper liquid layer containing finely divided tin oxide particles and the dispersant to give an aqueous slurry.

2. A process for producing a sintered ITO compact according to claim 1 wherein at least 70% by volume of the tin oxide powder to be dispersed in the aqueous medium is composed of secondary particles having a particle size of not larger than 1 µm.

3. A process for producing a sintered ITO compact according to claim 1 wherein the tin oxide powder is dispersed in 50 to 80% by weight, based on the weight of the tin oxide powder, of the aqueous medium.

4. A process for producing a sintered ITO compact according to claim 1 wherein the aqueous slurry is allowed to stand for the sedimentation of coarse particles of tin oxide for a time sufficient for making not larger than 4 µm the secondary particle size of the finely divided particles of tin oxide contained in the upper liquid layer of the aqueous slurry to be separated by decantation.

5. A process for producing a sintered ITO compact according to claim 1 wherein the indium oxide powder to be incorporated in the separated upper liquid layer is a compacted powder having a tap density of 1.2 to 2.4 g/cm³.

6. A process for producing a sintered ITO compact according to claim 1 wherein the amounts of the tin oxide powder and the indium oxide powder in the aqueous slurry to be cast in a mold are 5 to 15% by weight and 95 to 85% by weight, respectively, based on the total weight of the tin oxide powder and the indium oxide powder.

7. A process for producing a sintered ITO compact according to claim 1 wherein the as-cast green body is dried and compacted by cold isostatic pressing at a pressure of at least 2 ton/cm², the compacted green body is heated to a temperature of 300° to 500° C. at a heating rate of not higher than 5° C./hr, the heated green body is subjected to a dewaxing treatment at that temperature, and then the treated green body is sintered.

8. A process for producing a sintered ITO compact according to claim 1 wherein the sintering is effected at a temperature of 1,450° to 1,550° C. and an atmospheric pressure in an oxygen atmosphere.

* * * * *